United States Patent
Brosche (10) Patent No.: US 7,158,077 B2
(45) Date of Patent: Jan. 2, 2007

(54) RADAR DEVICE AND METHOD FOR SUPPRESSING INTERFERENCE WITH A RADAR DEVICE

(75) Inventor: Thomas Brosche, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 73 days.

(21) Appl. No.: 10/250,999

(22) PCT Filed: Dec. 22, 2001

(86) PCT No.: PCT/DE01/04911

§ 371 (c)(1),
(2), (4) Date: Dec. 16, 2003

(87) PCT Pub. No.: WO02/054101

PCT Pub. Date: Jul. 11, 2002

(65) Prior Publication Data

US 2004/0090361 A1    May 13, 2004

(30) Foreign Application Priority Data

Jan. 8, 2001    (DE) .............................. 101 00 414

(51) Int. Cl.
  *G01S 13/22*    (2006.01)
(52) U.S. Cl. .................. 342/137; 342/134; 342/145; 342/202; 342/203
(58) Field of Classification Search ............... 342/130, 342/134, 137, 145, 202, 203
See application file for complete search history.

(56) References Cited

U.S. PATENT DOCUMENTS

| | | | |
|---|---|---|---|
| 3,727,222 A | 4/1973 | Hollis | |
| 4,005,420 A * | 1/1977 | McDonald | 342/145 |
| 4,241,347 A * | 12/1980 | Albanese et al. | 342/130 |
| 5,291,202 A * | 3/1994 | McClintock | 375/130 |
| 5,337,052 A * | 8/1994 | Lohrmann et al. | 342/145 |
| 6,067,040 A | 5/2000 | Puglia | |
| 6,130,636 A * | 10/2000 | Severwright | 342/120 |
| 6,388,609 B1 * | 5/2002 | Paese et al. | 342/204 |

FOREIGN PATENT DOCUMENTS

| | | |
|---|---|---|
| DE | 41 34 188 | 4/1992 |
| EP | 0 984 299 | 3/2000 |
| EP | 1 048 960 | 11/2000 |

* cited by examiner

Primary Examiner—Ian J. Lobo
(74) Attorney, Agent, or Firm—Kenyon & Kenyon LLP (57) ABSTRACT

A radar device is described having an arrangement to generate a carrier signal having a carrier frequency $f_T$, an arrangement to generate pulses having a pulse repetition rate $f_{PW}$, an arrangement to split the carrier signal between a transmission branch and a reception branch, an arrangement to delay the pulses, an arrangement to mix the carrier signal in the reception branch with a reception signal, and an arrangement to integrate the mixed signal. An arrangement to modulate the carrier signal in the transmission branch with the delayed pulses and an arrangement to alter the delay in the pulses according to a predetermined code are also provided. A method of suppressing interference with the functioning of a radar device is also described.

15 Claims, 6 Drawing Sheets

Fig.1

Related Art

RADAR DEVICE AND METHOD FOR SUPPRESSING INTERFERENCE WITH A RADAR DEVICE

FIELD OF THE INVENTION

The present invention relates to a radar device having an arrangement to generate a carrier signal having a carrier frequency $f_T$, an arrangement to generate pulses having a pulse repetition rate $f_{PW}$, an arrangement to split the carrier signal between a transmission branch and a reception branch, an arrangement to delay the pulses, an arrangement to mix the carrier signal in the reception branch with a reception signal, and an arrangement to integrate the mixed signal. The present invention also relates to a method for suppressing interference with the functioning of a radar device, including generating a carrier signal having a carrier frequency $f_T$, generating pulses having a pulse repetition rate $f_{PW}$, splitting the carrier signal between a transmission branch and a reception branch, delaying the pulses, mixing the carrier signal in the reception branch with a reception signal and integrating the mixed signal.

BACKGROUND INFORMATION

Generic radar devices and methods are used for short-range sensors in motor vehicles, for example. They are used, e.g., to prevent accidents and to detect objects in a dead angle of a motor vehicle.

Figure 1:
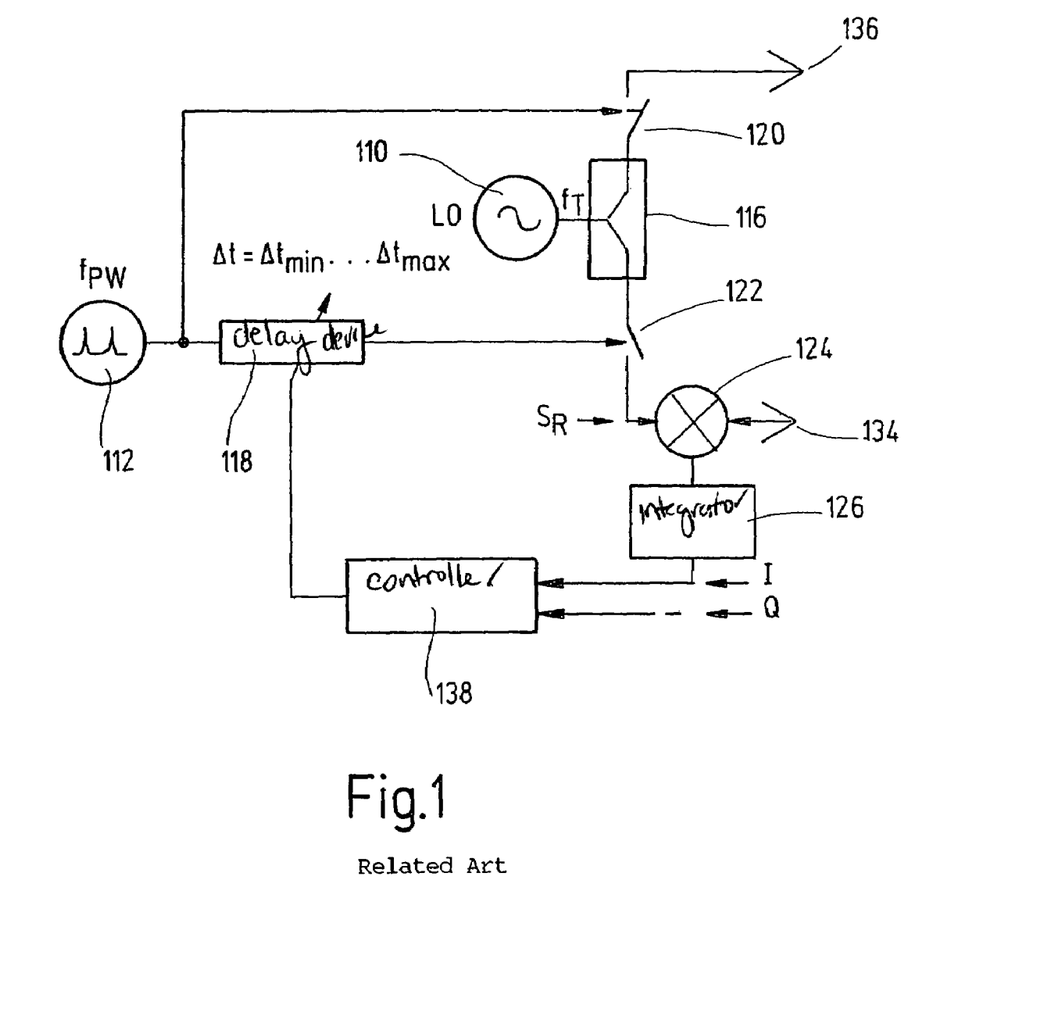
FIG. 1 shows a schematic diagram of a conventional radar device related art.

FIG. 1 shows schematically the basic design of a conventional radar device. A carrier frequency $f_T$ is generated by a local oscillator (LO) 110. This carrier frequency is divided by a power divider 116 between a transmission branch and a reception branch. In addition to carrier frequency $f_T$, a pulse repetition rate $f_{PW}$ is supplied by a pulse generator 112 for modulation of the carrier frequency. In the transmission branch, this modulation is accomplished with a switch 120 to which the carrier frequency is applied and which is switched at the pulse repetition rate. The signal thus generated is emitted by sending aerial 136. Modulation also takes place in the reception branch. However, for the purpose of this modulation, the pulses of the pulse repetition rate are delayed by a delay device 118. Modulation of carrier frequency $f_T$ is performed with these delayed pulses by actuation of switch 122 to which the carrier frequency is also applied. In this way, a reference signal $S_R$ is made available in the reception branch. This reference signal is mixed in a mixer 124 with a reception signal received via receiving aerial 134. The output signal of mixer 124 is sent to an integration means 126, e.g., a low-pass filter and an amplifier. The signal generated in this way is sent to a signal analyzer and controller 138, preferably after analog-digital conversion. Signal analyzer and controller 138 then determines the delay of delay device 118, this delay being varied between a value $\Delta t_{min}$ and $\Delta t_{max}$. For example, the delay may be varied by a microcontroller or a digital signal processor. It is also possible to use special hardware for this purpose. If the transit time of the radar pulses, which usually corresponds to twice the transit time between the target and the aerial, matches the delay, the amplitude of the output signal of mixer 124 is at its maximum. Thus, a correlation receiver is available so that it is possible that the delay set by controller 138 may be used to deduce the target distance and the radial velocity between the target and the aerial. FIG. 1 shows as an example only the formation of the in-phase (I) signal. The quadrature (Q) signal is formed in a similar manner by mixing with the carrier frequency shifted in quadrature.

It is generally desirable to suppress interference signals of a wide variety of causes. There have already been proposals for utilizing additional modulation of the microwave signal to separate signal components reflected on targets from interference signals. In particular, interference due to other non-coded transmitters, e.g., radio transmitters, and/or noise is suppressed by such methods.

However, ambiguities may occur in the determination of target distances outside of the unambiguous range of a pulsed radar device. The ambiguity range at target distances r is:

$$c/(2f_{PW}) \leq r \leq R_{max}$$

where
$f_{PW}$: pulse repetition rate
c: velocity of light
$R_{max}$: radar range.
The following target distances are measured in the ambiguity range:

$$\hat{r} = r - nc/(2f_{PW})$$

where n=1, 2, 3, . . . and $\hat{r} \geq 0$.

In addition, there is interference due to multiple pulse radar sensors operating simultaneously when the sensors are operating within the range of another particular sensor. There may be interference, i.e., for detection of apparent targets. A measured apparent signal delay and/or the corresponding distance from the apparent target will depend on the position between the transmission point in time and the reception point in time of the particular sensors. If one considers sensors installed in different vehicles, for example, it may occur that the sending aerials and receiving aerials of the different sensors are opposite one another. In this case, the interference influence between individual sensors is usually no longer negligible.

SUMMARY

In an example embodiment of the present invention, a radar device includes an arrangement to modulate the carrier signal in the transmission branch with the delayed pulses, and an arrangement to alter the delay in the pulses according to a predetermined code. It is possible in this way to sample the measurement space, i.e., the period of time between minimum delay $\Delta t_{min}$ and maximum delay $\Delta t_{max}$, not with a monotonic rise or fall, but instead in an order determined by the code. Such a method of sampling is comparable to random sampling. After sampling, the measured values may be ordered according to ascending or descending values for particular delays $\Delta t$ so that traditional further processing of measured values may take place subsequently. This "irregular" sampling is advantageous because mutually interfering radar sensors are usually operated at different points in time so that they also detect the measured values for sampling intervals, which are usually different, at a particular point in time. Due to the modulation of the carrier signal in the transmission branch, the time intervals between the radar pulses sent from the various sensors are constantly changing. Therefore, the measured distances from the apparent targets which occur due to the mutual interference of the radar sensors also change. Meanwhile, the signal energy of the apparent targets is distributed over the measurement space, so that the distinction between apparent and real targets may be improved. In other words, a separation of signals between different sensors is achieved. If different codes and thus different sequences are used for the sampling intervals for modulation of the transmission point in time with different radar sensors, a further reduction in the influence of interference is possible. The time intervals between the sampling intervals and the particular pulses sent previously also change during switching between the particular samplings, so the signal energy of ambiguous targets at a distance r from the transmitter $$c/(2f_{PW}) \leq r \leq R_{max}$$

is scattered within the measurement space. Since this change in the time interval takes place only once per switching, it is useful to switch as frequently as possible. However, the maximum occurrence of switching depends on the integration time required for discovery of a target. Switching for each radar pulse transmitted would be ideal. This is possible when the individual pulses have a sufficient signal energy for single pulse detection, i.e., a sufficient signal-to-noise ratio.

An arrangement to modulate the carrier signal in the reception branch with a constant delay is preferably provided. A constant delay may be adequate because the delay in the transmission branch permits a variation and thus a detection of distance. It is thus used only to ensure that the reference pulse is always delayed with respect to the pulse transmitted.

The present invention is particularly advantageous due to the fact that the arrangement to generate a pulse repetition rate $f_{PW}$ has a PN ("pseudo noise") code generator and the arrangement to delay the pulses has an arrangement to code shift. When using such a discrete shift in a PN code, the delay of the modulation in the reference signal may be omitted. Negative values for the "delay" (advance) in the modulation in the transmission signal may be calculated in advance and/or adjusted with the help of the discrete code shift. Through the use of PN codes it is possible to improve the S/N ratio because it is possible to work at an increased pulse repetition rate with PN codes having a suitable autocorrelation function without causing any reduction in the maximum radar range.

It may be advantageous if an arrangement is provided to alter the transmission points in time and the reception points in time. In particular when the delay is accomplished by code shifting, it is possible to implement different modulation principles in the transmission branch and in the reception branch, with the modulation optionally taking place with the differently shifted codes.

Carrier frequency $f_T$ is preferably an integral multiple of pulse repetition rate $f_{PW}$. Under these conditions, modulation may be implemented by an integral or half-integral code shift.

It may be advantageous if an arrangement to cyclically alter the code is provided. This is a suitable option for varying the altered code and thus having an advantageous effect on interference suppression.

It may be particularly advantageous if an arrangement is provided to generate ASK (amplitude shift keying)-modulated and/or PSK (phase shift keying)-modulated signals. Such an arrangement results in a further suppression of interference effects.

Furthermore, for the same reason, it may be advantageous if an arrangement to polarize the signals is provided.

In accordance with an example method of the present invention, the carrier signal in the transmission branch is modulated with the delayed pulses, and the delay in the pulses is altered according to a predetermined code. In this way it is possible to sample the measurement space, i.e., the period of time between minimum delay $\Delta t_{min}$ and maximum delay $\Delta t_{max}$ not rising or falling monotonically but instead in a sequence determined by the code.

The carrier signal in the reception branch is preferably modulated with a constant delay. A constant delay may be sufficient because the delay in the transmission branch permits a variation and thus a detection of distance. It is thus used only to ensure that the reference pulse is always delayed with respect to the pulse transmitted.

It may also be beneficial if a PN (pseudo noise) code is generated and if the pulses are delayed by code shifting. In the case of using such a discrete shift in a PN code, the delay in modulation may be omitted in the reference signal.

Negative values for the "delay" (advance) in the modulation in the transmission signal may be calculated in advance and/or adjusted with the help of the discrete code shift. Through the use of PN codes it is possible to improve the S/N ratio because in the case of PN codes with a suitable autocorrelation function it is possible to operate with an increased pulse repetition rate without causing a reduction in the maximum range of the radar.

It may be beneficial if the transmission points in time and the reception points in time are altered. In particular when the delay is accomplished by code shifting, it is possible to implement different modulation principles in the transmission branch and in the reception branch, in which case the modulation may take place with the differently shifted codes.

Carrier frequency $f_T$ is preferably an integral multiple of pulse repetition rate $f_{PW}$. Under these circumstances, modulation may be implemented by an integral or half-integral code shift.

It may also be advantageous if the code is cyclically altered. This is a suitable option for varying the altered code and thus having an advantageous effect on the interference signal suppression.

It may be beneficial if ASK (amplitude shift keying)-modulated signals and/or PSK (phase shift keying)-modulated signals are generated. Such an arrangement results in a further suppression of interference effects. For the same reason, it may be beneficial if the signals are polarized.

The present invention is based on the surprising finding that interference due to transmission signals from other radar sensors, in particular similar radar sensors, may be suppressed by coding of the transmission point in time at the transmitter end. In addition, the risk of overriding of the I channel and/or the Q channel due to mutual interference of the radar sensors may be reduced. Likewise, signals from targets at target distances in the ambiguity range may be suppressed. This method is also advantageously applicable with radar systems which use already coded transmission signals and/or reference signals generated, e.g., with the help of PN coding by phase modulation and/or amplitude modulation. Furthermore, in the example embodiments, the length of the interval required for integration and/or averaging, e.g., in the case of PN coding, is not influenced. The cutoff frequency of a low-pass filter used for integration may thus remain unchanged and/or be selected with regard to an optimum value for the signal-to-noise ratio.

BRIEF DESCRIPTION OF THE DRAWINGS

The present invention is explained below with reference to the accompanying drawing on the basis of preferred exemplary embodiments.

DETAILED DESCRIPTION OF EXAMPLE EMBODIMENTS

Figure 2:
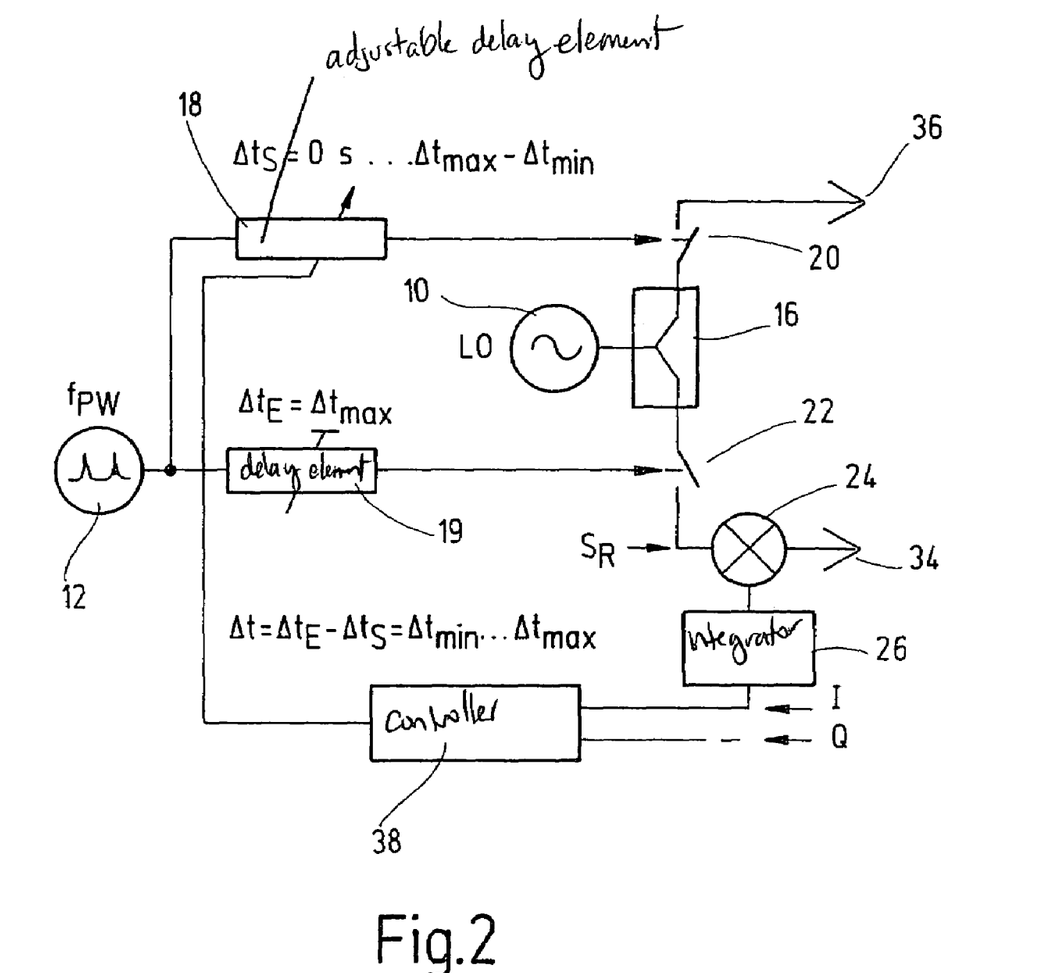
FIG. 2 shows a schematic diagram of a radar device according to an example embodiment of the present invention.

FIG. 2 shows a schematic diagram of a radar device according to an example embodiment of the present invention. A local oscillator 10 is connected to a power divider 16. This power divider 16 is connected to a transmission branch. Part of the power of local oscillator 10 is output by power divider 16 into the reception branch. Furthermore, a pulse generator 12 is provided for generating pulse repetition rate $f_{PW}$. The output of the pulse generator is connected to an adjustable delay element 18 and to an adjustable or non-adjustable delay element 19. The output of adjustable delay element 18 actuates a switch 20 in the transmission branch for modulating the carrier signal. The output signal of the adjustable or non-adjustable delay element 19 actuates a switch 22 in the reception branch for modulating the carrier signal in the reception branch and thus for providing a reference signal $S_R$. The signal modulated by switch 20 in the transmission branch is sent by sending aerial 36 and reflected at a target. This signal is received by a receiving aerial 34 and mixed with reference signal $S_R$ in a mixer 24. The mixed signal is subsequently sent to an arrangement 26 to integrate, e.g., a low-pass filter and an amplifier. The signal thus generated is sent to a signal analyzer and controller 38 at the input end, adjustable delay element 18 being controlled at the output end.

Consequently, with the radar device according to FIG. 2, the transmission points in time may be varied by adjustable delay element 18. The delays are in a range of $\Delta t_S = 0$ s ... $\Delta t_{max} - \Delta t_{min}$, and it should be taken into account that non-adjustable delay element 19 supplies a delay $\Delta t_E = \Delta t_{max}$. This fixed delay is useful because the reference pulse must always be delayed with respect to the pulse transmitted. This yields as total delay $\Delta t = \Delta t_E - \Delta t_S = \Delta t_{min}$ ... $\Delta t_{max}$. FIG. 2 shows as an example only the formation of the in-phase (I) signal. The quadrature (Q) signal is formed in a similar manner by mixing with the carrier frequency which has been shifted in quadrature.

Figure 3:
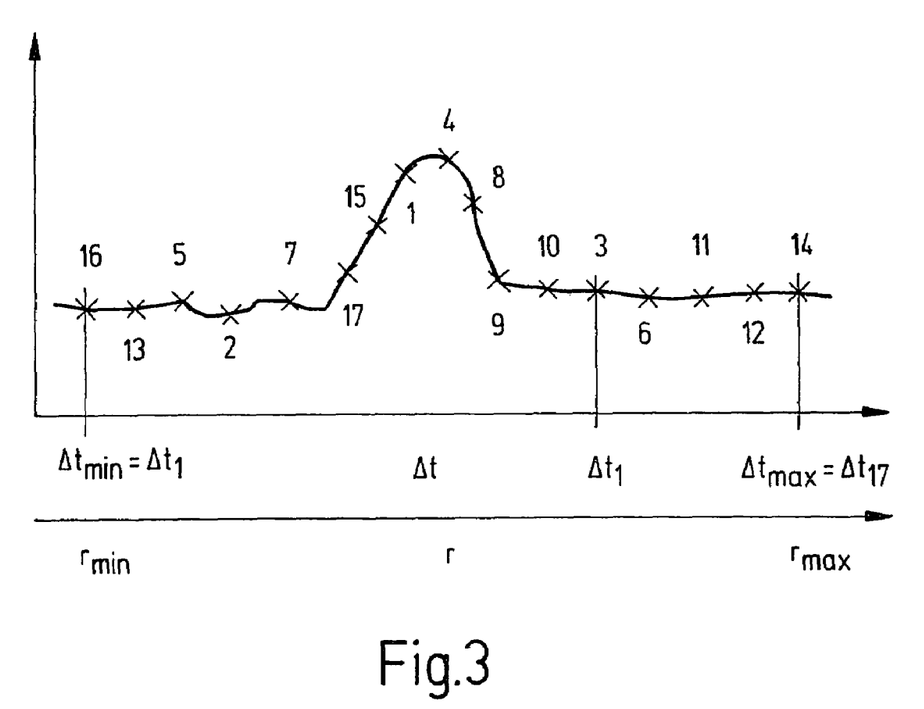
FIG. 3 shows a graphic plot of a signal amplitude to illustrate a sampling method.

FIG. 3 shows how measurement space $\Delta t_{min}$ ... $\Delta t_{max}$ is sampled as an example, plotting an amplitude A over signal delay $\Delta t$. In parallel with the delay time axis, a distance axis is also shown, indicating a distance in the range $r_{min}$ ... $r_{max}$ between the transmitter and the target. The curve of amplitude A is subdivided into equidistant intervals, these being parameterized with numbers 1 through 16, for example. These numbers indicate the order of sampling. In all intervals, the I and Q output signals of the sensor are detected. The order of sampling and thus the value for the delay which is set in each case is defined by a suitable code. After sampling, the measured values may be ordered according to ascending or descending values for $\Delta t$. Consequently, the measured values may then be processed further in the traditional way.

The advantageous effect of sampling, as shown in FIG. 3 for example, is explained by the fact that the different radar sensors are usually operated at different points in time. Therefore, at a certain point in time they detect the measured values for sampling intervals which are usually different. Since the time intervals between the radar pulses transmitted by the various sensors change constantly, there is also a change in the distances from the apparent targets. The signal energy of the apparent targets is thus distributed over measurement space $\Delta t_{min}$ ... $\Delta t_{max}$ so that there is a differentiation between apparent targets and real targets in an advantageous manner. Likewise, the signal energy of ambiguous targets is scattered within the measurement space.

Figure 4:
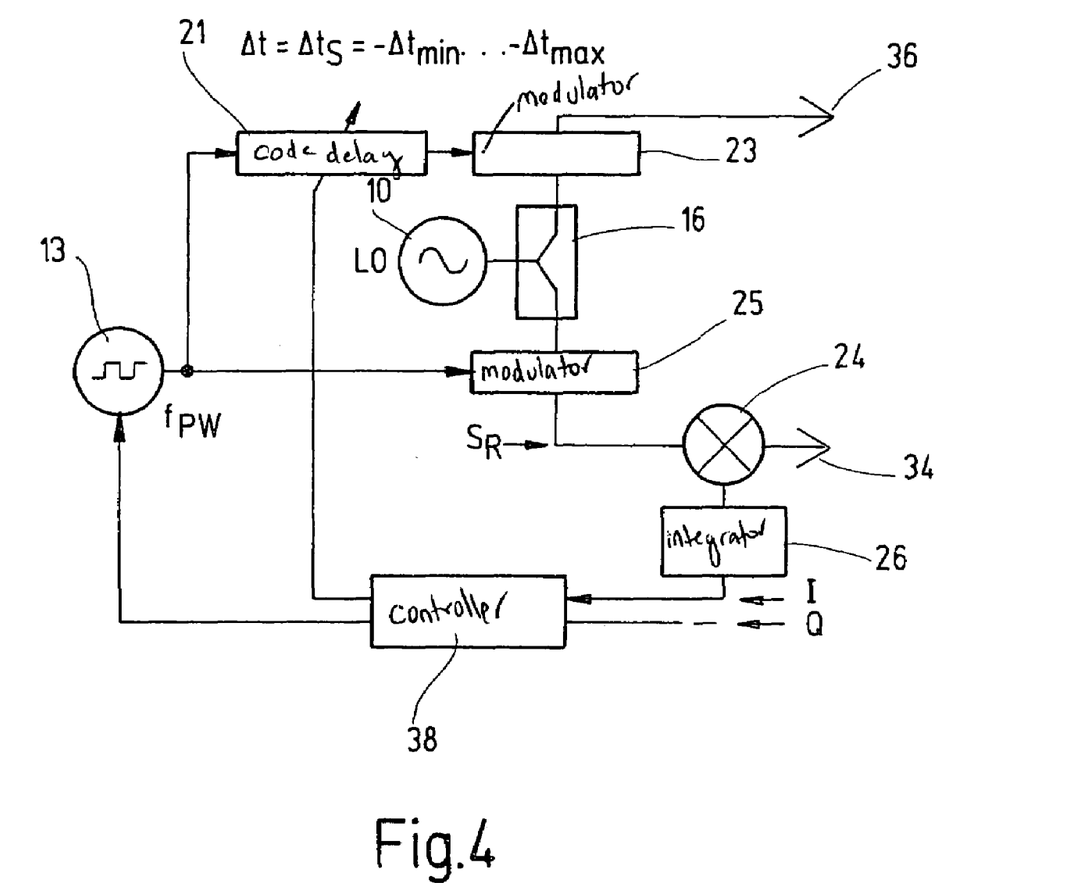
FIG. 4 shows a schematic diagram of another radar device according to an example embodiment of the present invention.

FIG. 4 shows another radar device according to an example embodiment of the present invention. Elements corresponding to those in FIG. 2 are labeled with identical reference notation. The particular feature of the embodiment according to FIG. 4 is that a PN code generator 13 is provided, the choice of code being handled by the signal analyzer and controller 38. This code is sent to a code delay 21, where it is delayed in a manner determined by controller 38 in an interval between $-\Delta t_{min}$ and $-\Delta t_{max}$. The code is then sent to a modulator 23 in the transmission branch. The non-delayed code is transmitted to a modulator 25 in the reception branch, supplying reference signal $S_R$ as the output signal. When using a discrete shift in the PN code, the modulation delay in the reference signal may be omitted because negative values for the "delay" (advance) in the modulation in the transmission signal may be calculated in advance and/or adjusted with the help of the discrete shift. FIG. 4 shows only the formation of the in-phase (I) signal. The quadrature (Q) signal is formed in a similar manner by mixing with the carrier frequency phase shifted in quadrature.

Figure 5:
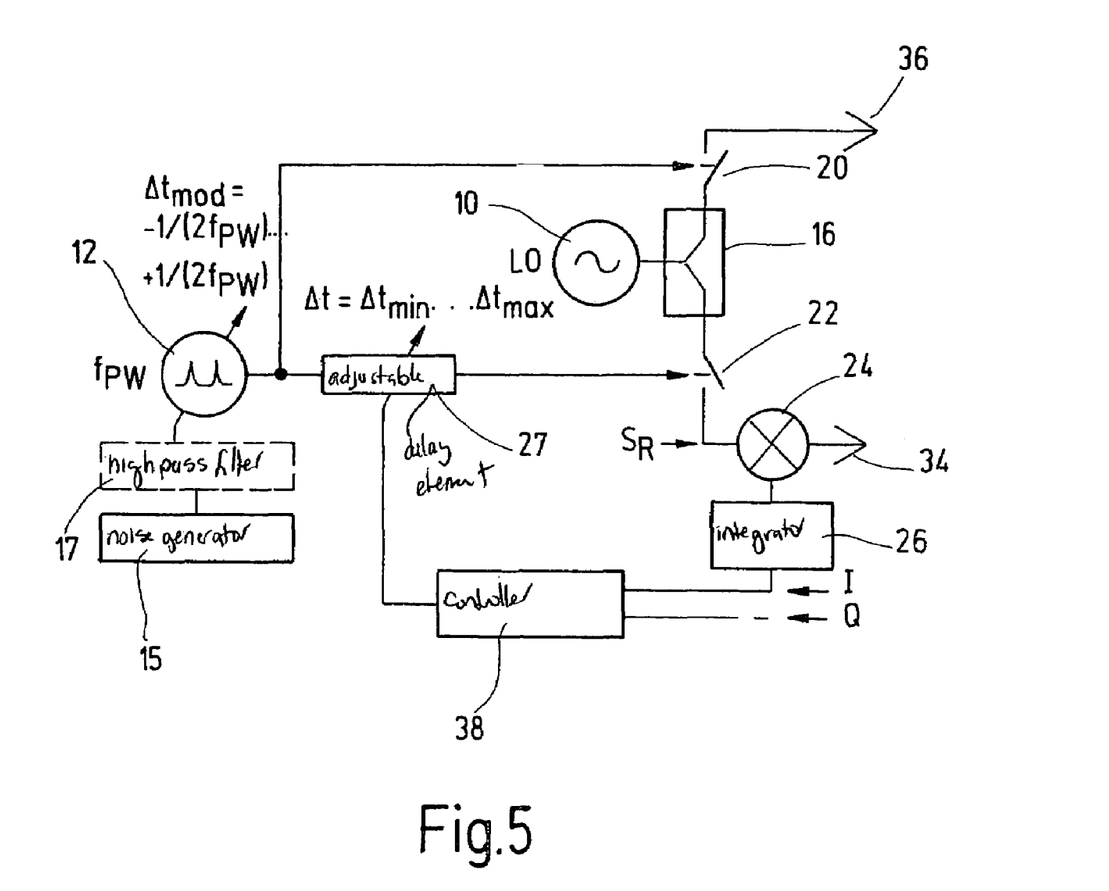
FIG. 5 shows a schematic diagram of another radar device according to an example embodiment of the present invention.

FIG. 5 shows another example embodiment of a radar device according to the present invention. Elements corresponding to those from FIGS. 2 and/or 4 are labeled with the same reference notation. The special feature of the radar device according to FIG. 5 is that pulse repetition rate $f_{PW}$ is generated with the help of a noise generator 15. To suppress frequencies below the maximum Doppler frequency $f_{dmax}$ to be processed, the output signal of noise generator 15 may be filtered through a high-pass filter 17. As a result, this yields a delay in the transmission points in time as well as in the reception points in time with a delay time $\Delta t_{mod}$. In the present case, the radar device is tuned with an adjustable delay element 27 which controls the carrier signal modulation to generate reference signal $S_R$. The radar device according to FIG. 5 permits an improved suppression of ambiguous targets in comparison with the radar device according to FIG. 2 because the phase angle of pulse repetition rate $f_{PW}$ is altered from one pulse to the next. Another advantage of this radar device is that the remaining signal analysis corresponds to the related art according to FIG. 1 so that only minor modifications are to be made in the hardware. FIG. 5 also shows as an example only the formation of the in-phase (I) signal. The quadrature (Q) signal is formed in a similar manner by mixing with the carrier frequency shifted in quadrature.

Figure 6:
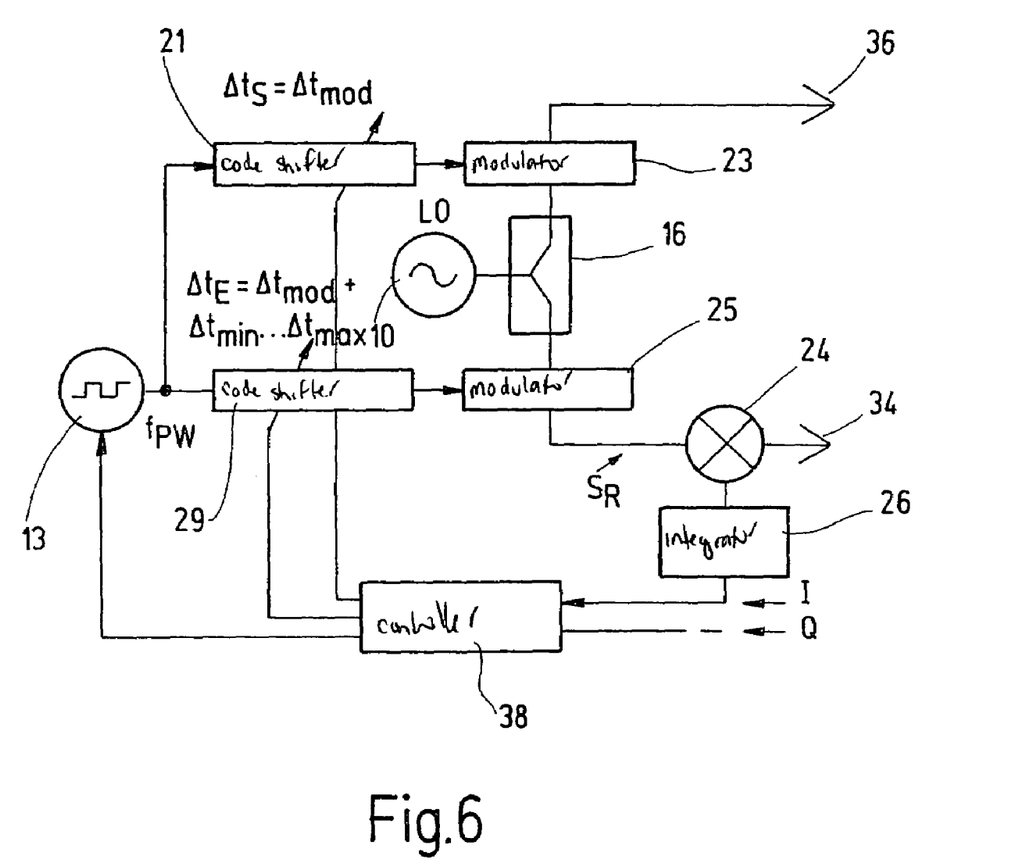
FIG. 6 shows a schematic diagram of another radar device according to an example embodiment of the present invention.

FIG. 6 shows another example embodiment of a radar device according to the present invention where again a PN code generator 13 is provided, supplying the pulse repetition rate to a first arrangement 21 to code shift and to a second arrangement 29 to code shift. Both arrangements 21, 29 to code shift are adjusted by controller 38, which is also responsible for the choice of the PN code. The output signals of the first arrangement 21 to code shift are sent to a modulator 23 in the transmission branch, so that modulation of the carrier signal takes place in the transmission branch using a code shifted by $\Delta t_S = \Delta t_{mod}$. In the reception branch, the carrier signal is modulated in a modulator 25 using a code which is delayed by $\Delta t_E = \Delta t_{mod} + \Delta t_{min} \ldots \Delta t_{max}$, so that a delayed reference signal $S_R$ is made available. If it is assumed that the carrier frequency is an integral multiple of the pulse repetition rate, then the modulation is implementable, e.g., by an integral or half-integral code shift. This may be altered, e.g., with each period of the code used or for each measurement interval. With the radar device according to FIG. 6, for example, only the formation of the in-phase (I) signal has been shown. Again the quadrature (Q) signal is formed in a similar manner by mixing with the carrier frequency shifted in quadrature.

The preceding description of the exemplary embodiments according to the present invention is given only for the purpose of illustration and not for the purpose of restricting the present invention. Within the scope of the present invention, various changes and modifications are possible without going beyond the scope of the present invention or its equivalents.

What is claimed is:

1. A radar device, comprising:
    an arrangement to generate a carrier signal having a carrier frequency;
    an arrangement to generate pulses having a pulse repetition rate;
    an arrangement to split the carrier signal between a transmission branch and a reception branch;
    an arrangement to modulate the carrier signal in the reception branch and in the transmission branch with the pulses;
    an arrangement to delay the pulses in the reception branch with a constant delay;
    an arrangement to delay the pulses in the transmission branch with a variable delay;
    an arrangement to supply a predetermined code to the delay arrangement in the transmission branch;
    an arrangement to mix the carrier signal in the reception branch with a reception signal;
    an arrangement to integrate the mixed signal; and
    an arrangement to alter the delay in the pulses in the transmission branch according to the predetermined code so that a distance range scanned by the radar device pseudo-randomly varies.

2. The radar device as recited in claim 1, wherein the arrangement to generate the pulses having the pulse repetition rate includes a pseudo noise code generator, and wherein the arrangement to delay the pulses includes an arrangement to code shift.

3. The radar device as recited in claim 1, further comprising:
    an arrangement to alter transmission points in time and reception points in time.

4. The radar device as recited in claim 1, wherein the carrier frequency is an integral multiple of the pulse repetition rate.

5. The radar device as recited in claim 1, further comprising:
    an arrangement to cyclically alter the code.

6. The radar device as recited in claim 1, further comprising:
    an arrangement to generate at least one of amplitude shift keying-modulated signals and phase shift keying-modulated signals.

7. The radar device as recited in claim 1, further comprising:
    an arrangement to polarize the signals.

8. A method for suppressing interference with the functioning of a radar device, comprising:
    generating a carrier signal having a carrier frequency;
    generating pulses having a pulse repetition rate;
    splitting the carrier signal between a transmission branch and a reception branch;
    modulating the carrier signal in the reception branch and in the transmission branch with the pulses;
    delaying the pulses in the reception branch with a constant delay;
    delaying, by a delay arrangement in the transmission branch, the pulses in the transmission branch with a variable delay;
    supplying a predetermined code to the delay arrangement in the transmission branch;
    mixing the carrier signal in the reception branch with a reception signal;
    integrating the mixed signal; and
    altering the delay in the pulses in the transmission branch according to the predetermined code so that a distance range scanned by the radar device pseudo-randomly varies.

9. The method as recited in claim 8, further comprising:
    generating a pseudo noise code, wherein the pulses are delayed by code shifting.

10. The method as recited in claim 8, further comprising:
    altering transmission points in time and reception points in time.

11. The method as recited in claim 8, wherein the modulating step includes simultaneously modulating the carrier signal in the transmission and reception branches by one of phase modulation or frequency modulation of the pulse repetition rate.

12. The method as recited in claim 8, wherein the carrier frequency is an integral multiple of the pulse repetition rate.

13. The method as recited in claim 8, further comprising:
    cyclically altering the code.

14. The method as recited in claim 8, further comprising:
    generating at least one of amplitude shift keying-modulated signals, and phase shift keying-modulated signals.

15. The method as recited in claim 8, further comprising:
    polarizing the signals.

* * * * *